Dec. 24, 1935. K. F. CHANEY 2,025,270

FISH LURE

Filed Dec. 14, 1934

INVENTOR.
KENNETH F. CHANEY

BY
ATTORNEY.

Patented Dec. 24, 1935

2,025,270

UNITED STATES PATENT OFFICE 2,025,270

FISH LURE

Kenneth F. Chaney, Lakewood, Ohio

Application December 14, 1934, Serial No. 757,514

2 Claims. (Cl. 43—46)

My invention pertains to a fish lure which though it may be baited with some edible palatable to fish may like other so-called "artificial bait" be effectively employed without any covering for or attachment to the hook or hooks proper.

Objects of my invention have been (a) the origination of a durable, adequately cheap albeit attractive design, (b) compactness and proportionately increased weight to minimize wind resistance thereby permitting a greater casting distance and allowing the lure more quickly to sink in water and to be less susceptible to currents in comparison with certain other artificial lure structures, (c) more life-like action at all retrieving speeds through the water while adapted at moderate speed to maintain a uniform depth thereby especially adapting it for trolling and while retrieving casts; and also effectively simulating the sinuous travel of live baits while free even at speeds slow enough to coax a sluggish or satiated fish to seize it.

The lure comprises a body portion, exemplifiedly shown to be shaped like a minnow, and forwarly is provided with a spoon-shaped resistance disc which is preferably though not essentially fixed at the lower front side. It also comprises a stabilizing fin preferably fixed at the top. At the rear end of the body a single or a gang hook is connected, preferably loosely and with or without buck tail, feathers, pork-rind or other equivalent striker.

More specifically, my fish lure is designed to produce an animated effect to various types and shapes which may be given to the body thereof (minnow, crayfish, or frog) while drawn beneath the surface of water. Ordinarily, the bodies of lures of this general type, commonly known as "plugs," are larger than I intend to have them, commonly float and in many cases are designed in a position of rest to float in a substantially horizontal position, whereas I propose to make the body or its core of solid metal or in any case of enough weight (specific gravity greater than 1) so that it will normally hang suspended in quiet water in a substantially vertical position. While the dimensions of the body of my lure are variable its design, weight, shape and size and the position it assumes when suspended motionless in water from its point of attachment to a line or leader will determine the proper sizes and locations of two "resistance" features, a forward spoon and an upper fin, which as a cooperative combination I call an "animator". The spoon or forward resistance element, likewise preferably of metal, is located at the forward end of the body of the lure and extends beneath the point of connection of the body with the line so as to assume a mean plane rather close to the point of connection of the line. In order to prevent an undesirable roll over of the lure in its entirety, the upper resistance element is provided and preferably in the form of an upstanding metallic fin about perpendicular to the mean plane of the spoon and mainly located rearwardly thereof, though its shape, size and relative location depend upon the proportion of size and weight of all of the lure parts.

I have discovered that neither of the two resistance elements (both of which, by themselves, are believed to be old) will produce satisfactory animation, but that their combined effect (a cooperation, with a modification of function of each by the other) will produce the desired result of alternating partial rocking of the body and also alternating partial lateral turning of the body in a relatively transverse plane whereby an attached hook is or hooks are given a vibratory or compound oscillatory movement.

It is emphasized that the spoon and fin resistances operating in conjunction with each other contribute to an actuation which desirably simulates an animation—independently of standard spoon type lures having feathers or equivalent attachment to produce additional attraction or to cover the hook, but which incidentally reduce instead of increase the sinuous movements caused by a spoon and are in consequence to be distinguished from and not to be confused with my invention.

It is to be realized that the scope of my invention comprehends many equivalent constructions. The showing of the drawing and the particular description are merely specific exemplifications of a plurality of mechanical embodiments and arrangements.

Adverting to the drawing:—

A body 1 designed to look like a minnow is preferably of solid metal and is drawn substantially to full scale and is deliberately made heavy in proportion to its size, especially by comparison with the majority of marketed plugs. The forward end of the body has its lower side sloping upwardly at 2 and its front end carries a ring 3 which is purposely made somewhat larger than is customary and the ring 3 is normally disposed in a substantially vertical plane.

Linked with the ring 3 is another ring 4 to which is attached a line or leader 4a. My object in making the ring 3 larger than those usually employed is to allow the ring 4 a limited range of up and down movement with respect to the ring 3 in response to varying degrees of pull of the lure upon the line and depending upon the varying speeds with which the lure might be drawn through the water either when trolling or when retrieving it preparatory to another cast thereof.

Figure 2:
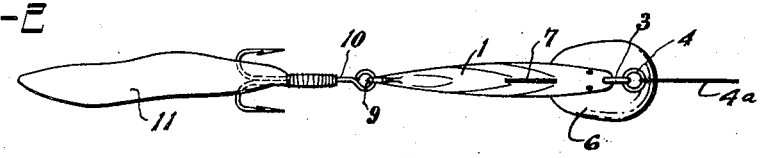
Fig. 2 is a top plan view of Fig. 1.
Figure 3:
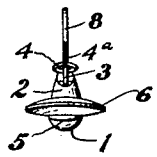
Fig. 3 is a front view of Fig. 1.

At the lower forward end 5 of the body I braze or otherwise suitably attach a concavo-convex spoon 6 which is large enough completely to encompass the forward end of the ring 3 substantially as illustrated by Fig. 2. The concave side of the disc shaped spoon 6 is preferably though not necessarily faced downwardly and the rear end of the spoon 6, preferably of chromium plated metal or some other glistening metallic coating, will be so attached to the body as to permit a limited range of flexing at the point of attachment as a means of adjustment of the mean plane of the spoon toward or away from the ring 3 because, I have discovered by demonstration that the larger and the less compact the weight of the selected design of body, the closer the spoon should be to the point of attachment to the line. When the lure is drawn through water, the spoon 6 will tend to turn to a line of least resistance, which is to say through an angle of about 90 degrees to an upright position, and such tendency, while desirable and augmented by the concavo-convex shape of the spoon in order to simulate an animation and cause a wobbling action, must be controlled by delimitation in both directions of rocking with respect to a horizontal plane so as to prevent complete rollovers which are undesirable because unnatural. For such purpose as the delimiting resistance means both against rolling and lateral turning movements I attach to the top of the body 1 an upwardly projecting and rigid stabilizing fin 7 having its forward edge 8 rearwardly of the front of the body and about over the point 5 of attachment of the spoon 6 to the body. The fin 7 projects upwardly a distance about twice the maximum diameter of the body. The shape of the fin may be widely varied.

Figure 1:
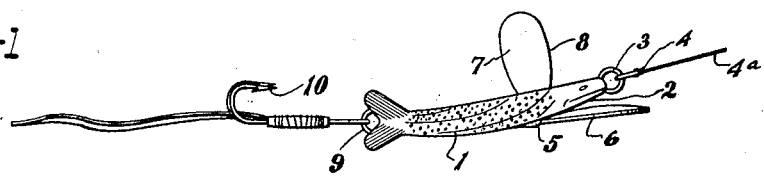
Fig. 1 is a side elevation of a fish lure embodying the principles of my invention and including a body representing a minnow as one species of live bait.

To a ring 9 at the rear end of the "minnow" body is loosely attached any desired type of hook 10 to which, if preferred, there may be attached an auxiliary lure such as a fabricated so called "buck tail" or a slice 11 of natural bacon rind. When only one hook structure is appended it is preferably at the rear end as shown in Figures 1 and 2, but additional hooks may be attached to the body rearwardly of the point 5 where the spoon is attached and rearwardly of the shape of fin exemplified in Fig. 1.

The dimensions of the weighted body are variable, but should be rather compact so that the over all size of the body is smaller than most marketed lures. The body being comparatively small and heavy and without any means to cause it to float in a predetermined position of rest tends to tip up in front when suspended in quiet water and tends to level out in proportion to the rapidity with which it is drawn through water. While the fin 7 will probably also be of metal and absolutely rigid, it is to be understood that it is essentially only substantially rigid. While the spoon 6 may be manually adjusted (sprung or flexed up or down) it is to be understood that it too is substantially rigid in the sense of being enough so as to maintain any established position of proximity to the point of attachment of the line 4a during its drag through water. One of the tried and proven merits of my flesh lure design, with its comparatively smaller body of specific gravity greater than the unit 1 of water, and with its deviation-causing front spoon and with its stabilizing fin is that it will conspicuously flip or swish the hooked tail end whereby further to simulate sinuous animation.

Figure 4:
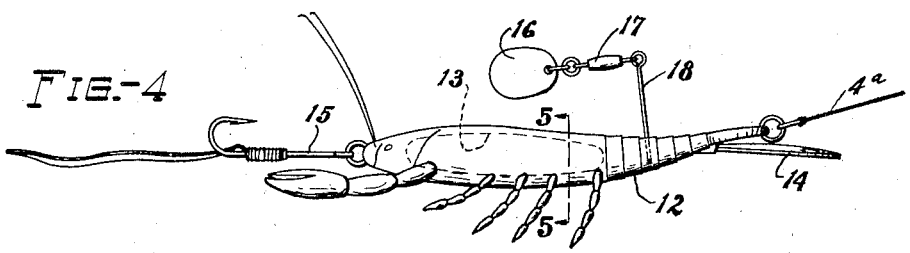
Fig. 4 is a side elevation of a modified form in respect to several details, including a crawfish arranged tail first as a body casing including a metal core, the forward spoon in a slightly altered position of adjustment and an elevated and swivelled spoon above the body as an equivalent substitution, though probably not to be preferred, of the fin.
Figure 5:
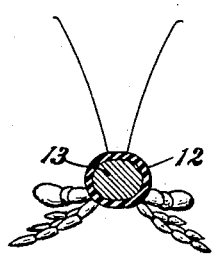
Fig. 5 is a sectional view along line 5—5 of Fig. 4.

Inviting attention to Figures 4 and 5, where as a live-bait-representing body 12 a crawfish instead of a minnow is illustrated, it will be observed that I have shown the body somewhat larger as a probably molded cover of rubber or other moldable material around a metal core 13. Since crawfish propel themselves tail first the line 4a is shown attached to the extremity of the tail and a forward spoon 14 is shown somewhat closer to the point of attachment of the line than the closeness of the spoon 6 to the ring 3 as appears in Fig. 1. To the rear or head end of the crawfish is attached a hook 15. For exercising the stabilizing function of the fin 7 I have here substituted a swivelled spoon 16 having that type of connection through the swivel 17 with the upper end of a rigid rod 18 which projects from the top of the body a short distance from the rear end of the spoon 14. I am unlikely to prefer this modification because of the added expense of manufacture, but it does approach the effectiveness of the fin 7 as a needed stabilizing element, by cooperating when the lure is drawn through water, continuously to check the rocking tendencies caused by the spoon 14.

I claim:—

1. In a fish lure, a body carrying a spoon mainly beneath its forward end and on its upper side carrying a fin having its front edge near the rear end of said spoon, said spoon and fin cooperating as substantially transverse resistance elements when drawn through water, the spoon to cause lateral rocking and the fin to prevent complete roll-over of said lure and a hook attached to the rear end of said body.

2. In a fish lure, a body having a specific gravity greater than 1, said body carrying a resistance plate wholly beneath, and extending both forwardly and rearwardly of the forward line-attaching point of said body, the latter also carrying a fin on its upper side, said spoon and fin cooperating as substantially transverse resistance elements when drawn through water and a hook attached to said body rearwardly of said fin.

KENNETH F. CHANEY.